J. N. GOODALL.
PIPE COUPLING.
APPLICATION FILED APR. 12, 1916.

1,237,249.

Patented Aug. 14, 1917.

Inventor:
John N. Goodall
By Henry J. Miller

UNITED STATES PATENT OFFICE.

JOHN N. GOODALL, OF MELROSE HIGHLANDS, MASSACHUSETTS, ASSIGNOR TO JEFFERSON UNION COMPANY, OF LEXINGTON, MASSACHUSETTS, A CORPORATION OF MAINE.

PIPE-COUPLING.

1,237,249.   Specification of Letters Patent.   Patented Aug. 14, 1917.

Application filed April 12, 1916. Serial No. 90,764.

*To all whom it may concern:*

Be it known that I, JOHN N. GOODALL, a citizen of the United States, residing at Melrose Highlands, in the county of Middlesex and State of Massachusetts, have invented new and useful Improvements in Pipe-Couplings, of which the following is a specification, reference being had to the accompanying drawings, forming part thereof.

This invention has reference to improvements in pipe couplings and particularly to such couplings having a pair of pipe receiving members adapted to be drawn together and secured together by a third member whereby parts of said members may be in compressive contact.

The object of the invention is to improve the construction of pipe couplings particularly with reference to the shape of the seating portions of the members.

Other objects of the invention will appear from the following description.

The invention consists in the means whereby the annular lip of one coupling member is simultaneously subject to constrictive and expansive pressure from two other members of dissimilar shape.

The invention also consists in such other novel features of construction and combination of parts as shall hereinafter be more fully described and pointed out in the claims.

Similar characters of reference designate corresponding parts throughout.

Figure 1:
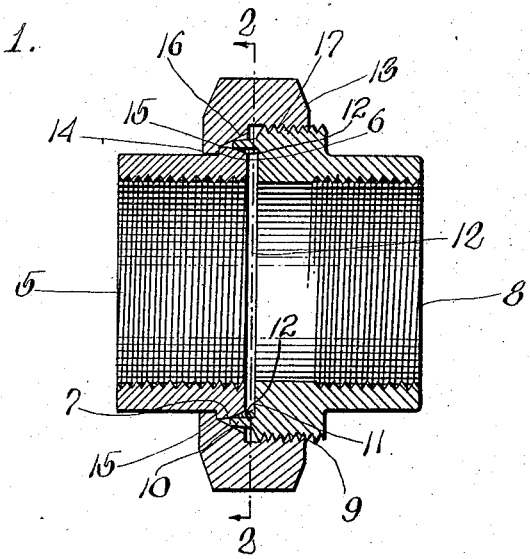
Figure 1, represents a sectional view of the improved pipe coupling taken on line 1—1 Fig. 2.
Figure 2:
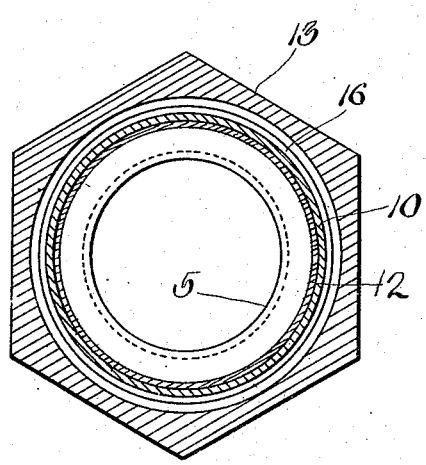
Fig. 2, represents a sectional view taken on line 2—2 Fig. 1.
Figure 3:
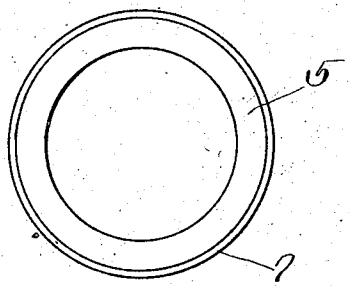
Fig. 3, represents an end view of the expansion member.
Figure 4:
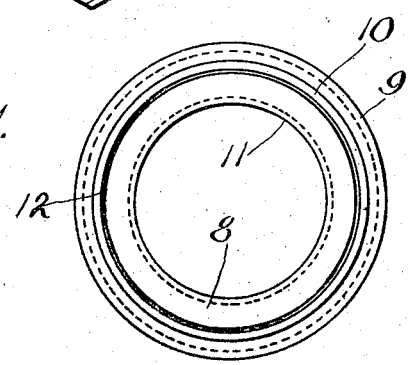
Fig. 4, represents a similar view of the seat member.

In carrying this invention into practice I provide a coupling comprising the pipe receiving collar members 5 and 8 and the coupling or drawing member 13. The collar member 5 has an inner screw thread and exteriorly has the annular shoulder 6 and the spheroconical end 7 curving substantially from said shoulder 6. Collar member 8 is also furnished with an inner thread and exteriorly has the screw thread 9 and the annular thin wall 10 having parallel sides and terminating at its inner portion at the annular step 11 which extends to the bore of this member 8. Within the wall 10 is located the thin packing ring 12 which is sustained at one edge by the step 11 and at one surface by said wall 10; this packing ring 12 is usually of a metal softer or more ductile than the metal of the member 8 and said packing ring may extend to the edge of said wall 10 if desired but the extension of said packing ring 12 from the step 11 toward the edge of the wall 10 will or may depend somewhat upon the shape and diameter of the end 7 of the collar member 5.

The drawing or coupling member 13 has the bore 14 to receive the exterior of member 5 and this bore 14 is embraced by the lip 15 to bear against the shoulder 6 of said member 5 and to furnish clearance to receive said shoulder; from this lip 15 extends the annular bevel compression shoulder 16 which enlarges the bore of this member 13 to a diameter having the screw thread 17 to engage the screw thread 9 of the member 8.

The parts of this improved coupling preferably are assembled as shown in Fig. 1 of the drawings and the screwing up of the drawing member 13 on thread 9 of member 8 effects simultaneously the compressive action or bearing of the bevel shoulder 16 on the exterior edge portion of the wall 10 of said member 8 and the expanding action or bearing of the spheroconical end 7 of member 5 against the inner portion of the wall 10 of member 8 and against the seat 12 contained within said wall 10, the spherical shape of this end 7 of member 5 accommodating itself to any slight variation in the alinement of the members 5 and 8.

The use of the seat 12 is particularly desirable when the coupling members are made of iron as, in that case, the seat 12 may be made of brass, copper or some other suitable metal and being thin and otherwise of small dimensions does not add materially to the cost of the coupling. In some cases the seat 12 may of course be omitted.

Having thus described my invention I claim as new and desire to secure by Letters Patent—

1. A coupling comprising a drawing member having a bore embraced by a lip and an annular bevel compression shoulder, said member having also a threaded bore larger than said shoulder, a collar member having a shoulder to receive said lip and an expansion member, and a second collar member having a thread to be engaged by the thread of said drawing member and an endwise extending wall to be received and compressed as to its edge between said expansion and compression members.

2. A coupling comprising a drawing member having a bore embraced by a lip and an annular bevel compression shoulder, said member having also a threaded bore larger than said shoulder, a collar member having a shoulder to receive said lip and an expansion member, and a second collar member having a bore, an exterior thread to be engaged by the thread of said drawing member, a wall of larger diameter than the bore of this latter member and having parallel surfaces, and an annular packing closely fitting against the inner surface of said wall and having its edge bearing against the step between said wall and the bore of said latter member, said wall adapted to be received by said compression shoulder of the drawing member and to receive said expansion member.

JOHN N. GOODALL.

Copies of this patent may be obtained for five cents each, by addressing the "Commissioner of Patents, Washington, D. C."